United States Patent [19]

Ikeda et al.

[11] Patent Number: 5,275,881

[45] Date of Patent: Jan. 4, 1994

[54] POLYARYLATE FILM HAVING OPTICAL ISOTROPY AND PRODUCTION PROCESS THEREOF

[75] Inventors: Toshio Ikeda; Kouji Shimizu, both of Osaka, Japan

[73] Assignee: Kanegafuchi Kagaku Kogyo Kabushiki Kaisha, Osaka, Japan

[21] Appl. No.: 799,530

[22] Filed: Nov. 27, 1991

[30] Foreign Application Priority Data

Nov. 28, 1990 [JP] Japan .................................. 2-327369

[51] Int. Cl.$^5$ .............................................. C08G 63/00
[52] U.S. Cl. .................................. 428/332; 428/480; 528/176
[58] Field of Search .................. 528/176; 428/332, 480

[56] References Cited

U.S. PATENT DOCUMENTS

| | | | |
|---|---|---|---|
| 4,387,133 | 6/1983 | Ichikawa et al. | 428/215 |
| 4,419,399 | 12/1983 | Ichikawa et al. | 428/215 |
| 4,906,498 | 3/1990 | Ichikawa et al. | 428/64 |
| 4,985,285 | 1/1991 | Ichikawa et al. | 428/1 |

*Primary Examiner*—John Kight, III
*Assistant Examiner*—T. Mosley
*Attorney, Agent, or Firm*—Armstrong, Westerman, Hattori, McLeland & Naughton

[57] ABSTRACT

A polyarylate film having optical isotropy and process for the preparation thereof are disclosed, in which the film satisfies the following relationship (1) and (2);

$$W \geq 1000 - 70,000\ T^2 \qquad (1)$$

$$W \geq 850 - 70,000\ T^2 \qquad (2)$$

wherein the formula, T is a film thickness in mm and W is film width in mm, and the retardation value of the films (1) and (2) is not more than 20 n.m. and 10 n.m. over the whole range thereof, respectively.

3 Claims, 4 Drawing Sheets

POLYARYLATE FILM HAVING OPTICAL ISOTROPY AND PRODUCTION PROCESS THEREOF

FIELD OF THE INVENTION

The present invention relates to a polyarylate film having optical isotropy and a process for producing the film, and more specifically relates to a polyarylate film having so-called optical isotropy and which shows a very small retardation value and is suitable for use as electronic parts, optical parts, etc., and a process capable of obtaining such a film with a good yield.

The term "optical isotropy" means when a film being inspected is placed between two polarizing plates in a state of intercepting the passage of polarized light and the plates are rotated at ±90° in the plane, there is no change in the transmitted light. Also, the term "retardation value" means the deviation of the phase of the D line of sodium by double refraction.

BACKGROUND OF THE INVENTION

Recently, as base films for transparent electrically conductive films such as EL electrodes, display base plates for liquid crystals, etc., protection films for polarizing films, optical cards, etc., a thermoplastic resin film having a small double refraction and optical isotropy has been used. The reason is as follows. If a thermoplastic resin film having a large double refraction is used, the film is colored according to the phase difference of each wavelength of light, and in the case of using the film for a liquid crystal display plate, the images formed become indistinct. Also, if there are portions of a small double refraction and portions of a large double refraction in the range of the whole film (i.e., there is an uneven distribution of double refraction), uneven color and uneven density occur.

Hitherto, as one of the processes for producing thermoplastic resin films having a small double refraction (and optical isotropy), a flow stretching process has been used. The flow stretching process is a process of flow-stretching (or casting) a solution of an aromatic polyester resin (polyarylate), as the raw material for a film, dissolved in a solvent on a base material such as a resin film (e.g., polyethylene terephthalate film), a metal belt, a metal drum, etc. After subjecting the flow-stretched film to primary drying at a definite temperature to impart a self-supporting property to the film, the formed film is peeled off the base material and subjected to secondary drying until the solvent remaining in the formed film is usually below about 5% by weight to provide a desired synthetic resin film. The reason for drying the film in two stages as described above is that if the formed film is completely dried in one stage, it becomes difficult to peel the formed film off of the base material.

However, in the foregoing conventional process, there is a problem that the retardation value of the synthetic resin film obtained is usually about 60 n.m., and even when a synthetic resin film having a small retardation value is obtained, the double refraction of the film is largely distributed in the width direction and when the film is used as an optical film, the phase axis is diverged.

The reason that the distribution of the double refraction occurs in the width direction is assumed to be that since in the foregoing process, the secondary drying of the film is carried out in a tenter (a drying machine while stretching the film in the width direction) while fixing both edges of the film, when the film is shrunk by heating during drying or the film is shrunk during cooling, a large amount of shrinkage occurs in the central portion of the film and forms strain in the film.

SUMMARY OF THE INVENTION

As a result of various investigations, under such circumstances, the present inventors have discovered, although the reason has not yet been clarified at present, that when a synthetic resin film having a higher glass transition temperature than the temperature of the material forming a film thereon by drying is used as the base material for forming the film thereon, even when the film formed thereon is dried in one stage to obtain a desired amount of residual solvent, the flow-stretched polyarylate film can be easily peeled off from the base material.

Further, since secondary drying is not employed, it is unnecessary to use a tenter. Hence, a polyarylate film having a very small retardation value and excellent optical isotropy can be obtained with a good yield and with less steps.

Furthermore, it has been discovered that when a synthetic resin film having a higher glass transition temperature than the temperature of the material forming a film thereon by drying is used as the base material for forming the film and also primary and secondary dryings are carried out at proper temperatures, even though the number of steps is the same as that of a conventional method, a polyarylate film having a very small retardation value and excellent optical isotropy can be obtained in a good yield. According to the process of the present invention, the temperature of the material forming film by drying is considered as the same temperature as of drying atmospher since a thickness of the material is significantly low.

The invention has been made based on the foregoing knowledge and the object of this invention to provide a polyarylate film having a very small retardation value and excellent optical isotropy and to provide a process capable of producing the film in a good yield.

It has now been discovered that the foregoing and other objects can be achieved by the present invention as described hereinbelow.

According to a first embodiment of the present invention, there is provided a polyarylate film having optical isotropy, wherein the film satisfies the following relationship (1) between the thickness T (mm) of the film and the width W (mm) of the film and wherein the retardation value is not more than 20 n.m. in the whole range of the film;

$$W \cong 1000 - 70{,}000\ T^2 \qquad (1).$$

According to a second embodiment of the present invention, there is further provided a polyarylate film, wherein the film satisfies the following relationship (2) between the thickness T (mm) of the film and the width W (mm) of the film and wherein the retardation value is not more than 10 n.m. in the whole range of the film;

$$W \cong 850 - 70{,}000\ T^2 \qquad (2).$$

The polyarylate films having optical isotropy according to the first and second embodiments of the present invention described above can be easily obtained by the processes described below.

That is, according to a third embodiment of the present invention, there is provided a process for producing a polyarylate film having optical isotropy comprising a step of flow stretching a solution obtained by dissolving a polyarylate in a solvent on a synthetic resin film, a step of drying the flow-stretched solution at a drying temperature higher than the glass transition temperature of the polyarylate until the amount of residual solvent becomes not more than 1% by weight, and a step of peeling off the film so formed from the synthetic resin film, wherein the synthetic resin film has a glass transition temperature higher than the temperature of the material forming the film by drying or substantially not having a glass transition temperature. (One drying step process)

Also, according to a fourth embodiment of the present invention, there is provided a process of producing a polyarylate film having optical isotropy comprising a step of flow stretching a solution obtained by dissolving a polyarylate in a solvent on a synthetic resin film, a primary drying step of drying the flow-stretched solution at a definite drying temperature in the range of from a temperature of 50° C. lower than Tg (the glass transition temperature of the polyarylate) to Tg to form a gel film having an amount of residual solvent of not more than 5% by weight, a step of peeling off the gel film so formed from the synthetic resin film, and a secondary drying step of drying the gel film while stretching the film at a tension of not higher than 10 kg/cm$^2$ at a temperature of from 50° C. lower than Tg to Tg and not higher than the foregoing primary drying temperature until the amount of the residual solvent is not more than 1% by weight to provide the thermoplastic resin film, wherein the synthetic resin film has a glass transition temperature higher than the temperature of the material forming the film by drying in the foregoing primary drying step or substantially not having a glass transition temperature. (Two drying step process)

DETAILED DESCRIPTION OF THE INVENTION

Figure 1:
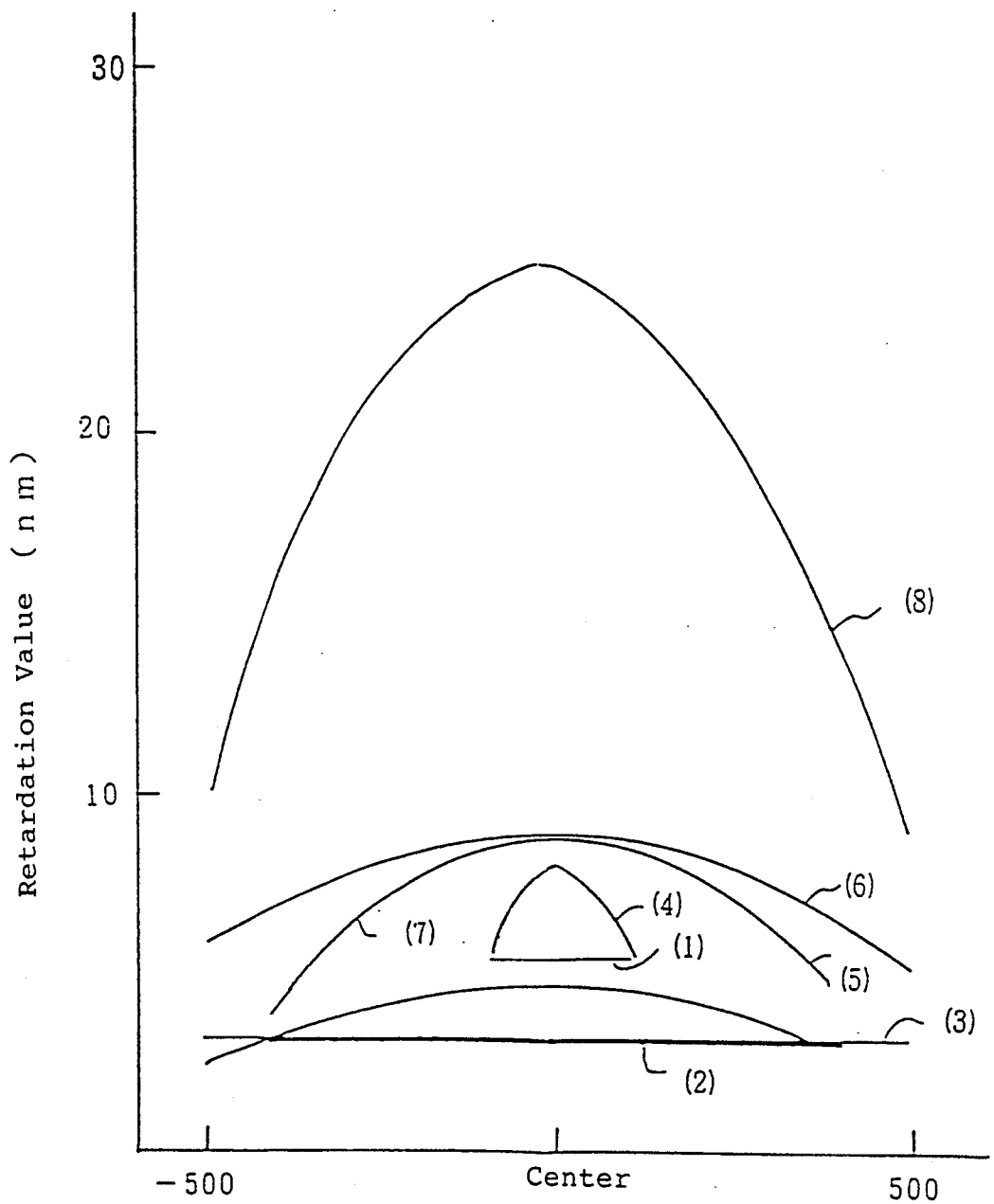
FIG. 1 is a graph showing the relationship between the distance (mm) from the center portion of a film and the retardation value (n.m.) of the film.

The reason for using a synthetic resin having a glass transition temperature higher than the temperature of the material forming a film thereon during drying or substantially not having a glass transition temperature as the base material for forming the film thereon in the one drying step process of the present invention is that if the base material undergoes thermal expansion or thermal shrinkage at drying, a film having a small double refraction and excellent optical isotropy is not obtained. Also, the reason for drying the film at a temperature higher than the glass transition temperature of the polyarylate film being flow-stretched is to shorten the drying time as much as possible and to obtain a polyarylate film having a high dimensional stability.

Also, in the one drying step process of the present invention, the solution of polyarylate that is flow-stretched is dried until the amount of the residual solvent becomes not more than 1% by weight, since if the amount of residual solvent is over 1% by weight, the residual solvent gives an unpleasant environment because of the solvent smell in the case of a volatile solvent, the heat resistance of the formed film is reduced, and, further, the workability of the film in the case of secondary molding of the film is reduced.

In addition, when a polyarylate film is dried on a conventional synthetic resin film, such as a polyethylene terephthalate film, as a base material to the extent that the amount of the residual solvent becomes not more than 1% by weight, it becomes difficult to peel off the film from the base material. However, since in the process of the present invention a synthetic resin film having a glass transition temperature of higher than the temperature of the material forming a film during drying is used as the base material, the polyarylate film formed thereon can be very easily peeled off although the reason has not yet been clarified.

As a synthetic resin film useful in the present invention, there is, for example, a polyimide film having a glass transition temperature of usually at least 280° C. and a viscosity of $\eta sp/c =$ about 0.9 (0.32 g/dl in chloroform at 32° C.).

Such a film is commercially available as "UPILEX R" (trade name, made by Ube Industries, Ltd.) having a glass transition temperature of about 280° C. Also, as a synthetic resin film substantially not having a glass transition temperature, there can be used, for example, "APICAL" (trade name, made by Kanegafuchi Kagaku Kogyo Kabushiki Kaisha) and "UPILEX-S" (trade name, made by Ube Industries, Ltd.).

According to the process of the present invention, a thermoplastic resin film having a very small retardation value over the whole range, or extent, of the film can be obtained, which means that a thermoplastic resin film having optical isotropy is capable of being produced in a good yield.

Also, the reason for using a synthetic resin film having a glass transition temperature higher than the temperature of the material forming a film thereon during drying in the primary drying step or substantially not having a glass transition temperature as the base material and drying the solution of flow-stretched polyarylate at a temperature of not higher than Tg of the polyarylate until the amount of the residual solvent becomes not more than 1% by weight in the secondary drying step in the two drying step process of this invention is same as the foregoing reason, i.e., greatly reducing the retardation value of the films over the whole range of the film.

Also, in the two drying step processes of this invention, the flow-stretched solution of polyarylate is subjected to primary drying and secondary drying at a temperature in the range of from 50° C. lower than Tg of the polyarylate film to the Tg since if the flow-stretched solution or film is dried at a temperature of lower than the limit, i.e., 50° C. lower than Tg of the polyarylate film, the thermal dimensional stability of the polyarylate film obtained is reduced and also a long time is required for drying.

Furthermore, in the two drying step processes of this invention drying of the gel film in the secondary drying step is carried out while stretching the gel film at a tension of not greater than 10 kg/cm² at a temperature lower than the temperature in the primary drying step since if the tension is over 10 kg/cm² and the gel film is dried at a temperature higher than that in the primary drying step, the retardation value becomes large and it becomes difficult to obtain a polyarylate film having the desired excellent optical isotropy.

According to the two drying step processes of the process of this invention, a thermoplastic resin film having a very small retardation value can be obtained but the yield of the thermoplastic resin film obtained is inferior to the one drying step process of the present invention.

In addition, in a conventional process, a thermoplastic resin film can not be obtained without considerably lowering the tension than 10 kg/cm². On the other hand, according to the process of the present invention, a thermoplastic resin film having a retardation value of less than about 10 n.m. can be obtained in a good yield even when a tension of about 10 kg/cm² is applied as shown in the examples described below.

The present invention is described more practically based on the following examples but the invention is not intended to be limited to these examples and can be properly changed within the scope of the present invention.

EXAMPLES 1 TO 3 AND COMPARISON EXAMPLE 1

(1) Preparation of Solution of Polyarylate (Flow stretching material):

In a 300 ml egg plant type flask were mixed 20.11 g of 2,2-bis(4-hydroxyphenyl)propane, 15.06 g of bis(3,5-dimethyl-4-hydroxyphenyl)methane, 0.95 g of p-t-butylphenol, 0.26 g of sodium hydrosulfite, 78.2 ml of an aqueous solution of 5N sodium hydroxide, and 176.8 ml of water in a nitrogen gas atmosphere and then the mixture was cooled to 5° C. to provide an alkali aqueous solution of a dihydric phenol (Solution I).

On the other hand, 21.32 g of terephthalic acid chloride and 9.14 g of isophthalic acid chloride were dissolved in 255 ml of methylene chloride in a 300 ml egg-plant type flask in a nitrogen atmosphere and the solution formed was cooled to 5° C. (Solution II).

In a one liter fraction flask were placed 137 ml of water and 0.16 g of benzyltributylammonium chloride as a catalyst in a nitrogen gas atmosphere and the mixture was cooled to 5° C. Then, while stirring the mixture vigorously, the foregoing solutions I and II were simultaneously added continuously to the mixture by means of pumps over a period of 10 minutes.

Two hours after finishing the addition of the solutions, a solution of 0.42 g of benzoyl chloride dissolved in 5 ml of methylene chloride was added to the mixture and after 20 minutes, stirring was stopped. Then, after removing by decantation an aqueous layer formed therein, the same amount of water was added to the residue and the mixture was neutralized with a small amount of hydrochloric acid with stirring. After repeating the decantation and desalting, the mixture was diluted with 300 ml of methylene chloride. Then, the solution was heated to a temperature of from 40° C. to 50° C. to remove water in the methylene chloride in the polymer formed by an azeotropic dehydration with methylene chloride and methylene chloride was distilled off until the polymer concentration become 15% by weight. The viscosity $\eta sp/c$ of the polymer formed was 0.90 (0.32 g/dl in chloroform at 32° C.). Also, Tg of the polymer was 215° C.

(2) Preparation of Polyarylate Film

The solution (dope) of polyarylate obtained in above-described step (1) was flow-stretched (cast) on supports each of 125 μm in thickness as shown in Table 1 below. After drying the flow-stretched solution stepwise by transporting the support having the flow-stretched solution thereon through drying furnaces for the time periods and at the temperatures shown in Table 1, the dried film was peeled off of each support to provide a polyarylate film having an amount of residual solvent of not more than 100 ppm and optical isotropy.

When the retardation value of each polyarylate film obtained was measured, the retardation value was 5.5 n.m. over the whole range of the film in the film of Example 1 and was less than 3 n.m. (the measurable limit value of the apparatus used) over the whole range of the films of Examples 2 and 3.

In addition, in the case of Comparison Example 1, since it was very difficult to peel off the polyarylate film from a stainless steel plate, the retardation value could not be measured.

In Table 1 below, supports A to C are as follows (the same in Table 2 below):

A: Polyimide film "UPILEX-R" (trade name, made by Ube Industries, Ltd., Tg:280° C.).
B: Polyimide film "APICAL" (trade name, made by Kanegafuchi Kagaku Kogyo Kabushiki Kaisha, having substantially no Tg).
C: Stainless steel plate (SUS 304).

TABLE 1

| Support | Thickness of polyarylate Film (μm) | Flow-stretched width of polyarylate (mm) | Drying Time (min.) | | | | |
|---|---|---|---|---|---|---|---|
| | | | 40° C. | 100° C. | 150° C. | 180° C. | 240° C. |
| A*1 | 120 | 200 | 9.0 | 6.0 | 6.0 | 6.0 | 6.0 |
| B*2 | 75 | 800 | 3.0 | 2.0 | 2.0 | 2.0 | 2.0 |
| B*3 | 50 | 1000 | 1.5 | 1.0 | 1.0 | 1.0 | 1.0 |
| C*4 | 120 | 200 | 9.0 | 6.0 | 6.0 | 6.0 | 6.0 |

*1 Example 1
*2 Example 2
*3 Example 3
*4 Comparison Example 1

EXAMPLES 4 TO 7 AND COMPARISON EXAMPLES 2 TO 4

The solution of polyarylate obtained in step (1) of Examples 1 to 3 was flow-stretched on supports each of 125 μm in thickness as shown in Table 2 below. After drying the flow-stretched solution stepwise by transporting the support having the flow-stretched solution thereon through furnaces for the time periods and temperatures shown in Table 2, each film formed was peeled off of each support to provide polyarylate films each having a residual solvent content of not more than 1.5%.

Then, while applying the tension shown in Table 2 to the film in the film transporting direction, each film was dried for the time periods at the temperatures shown in Table 2 to provide polyarylate films each having an amount of residual solvent of less than 100 ppm (the measurable limit of the apparatus used).

The retardation value of each polyarylate film in the width direction of the film is shown in Table 3 below.

In addition, in the process of Comparison Example 4, since it was very difficult to peel the polyarylate film formed off of the stainless steel plate, the retardation value of the film could not be measured.

FIG. 1 of the accompanying drawings is a graph showing the relationship of the retardation value (n.m.) (the ordinate) to the distance (mm) from the center of the film (the abscissa). Curves (4)-(7) are for Examples 4-7 respectively and curve (8) is for Comparative Example 2.

In addition, in FIG. 1, curves showing the retardation values in the width direction of the polyarylate films obtained in Examples 1 to 3 are shown for the sake of reference as plots (1)-(3) respectively.

Figure 2:
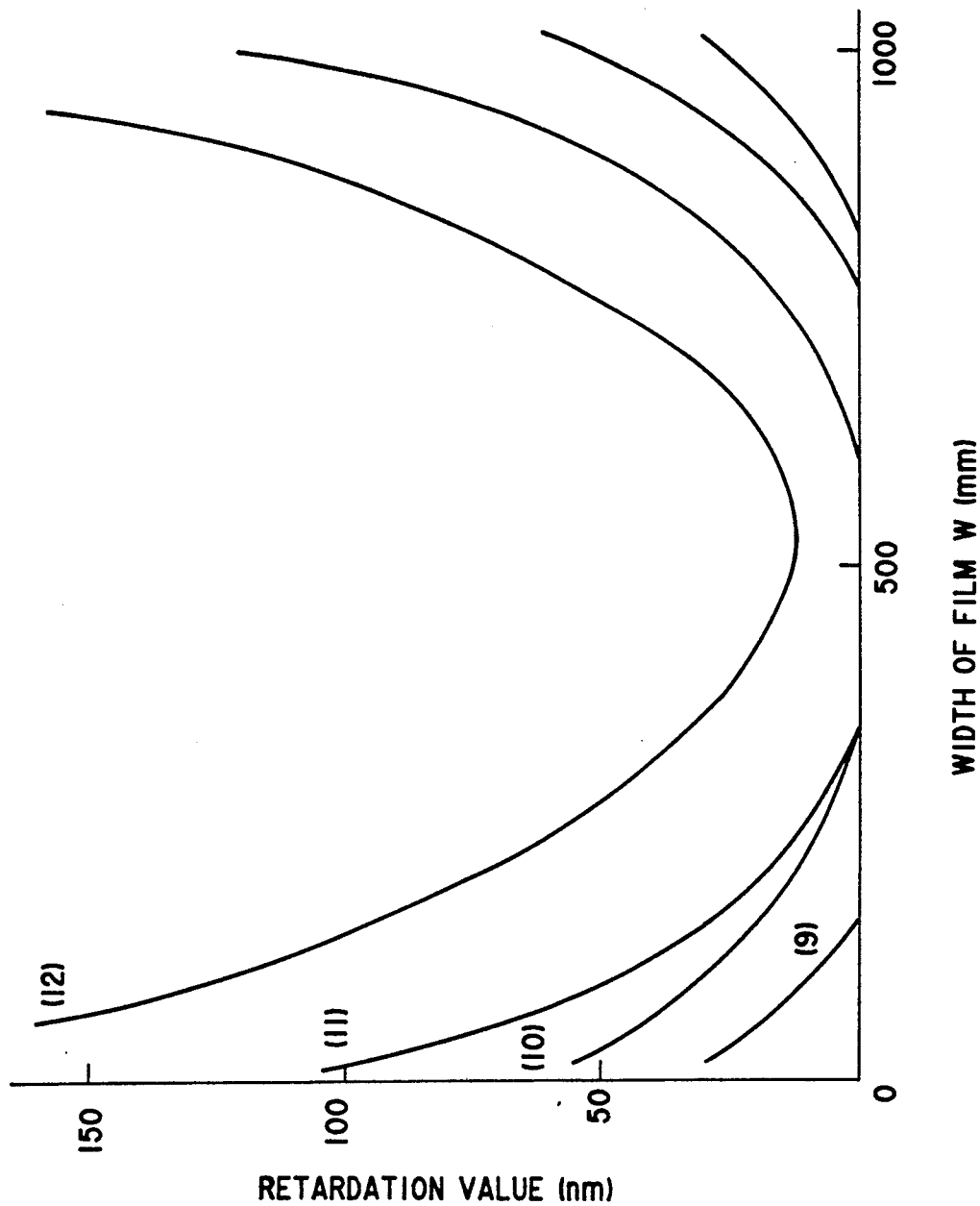
FIG. 2 is a graph showing the relationship between the width (mm) of a film and the retardation value (n.m.) of the film.

FIG. 2 is a graph showing the relationship between the retardation value (n.m.) (the ordinate) and the distance (mm) from the center of the film (the abscissa). Comparative Examples 5 through 8 are shown as curves (9) through (12) respectively.

Figure 3:
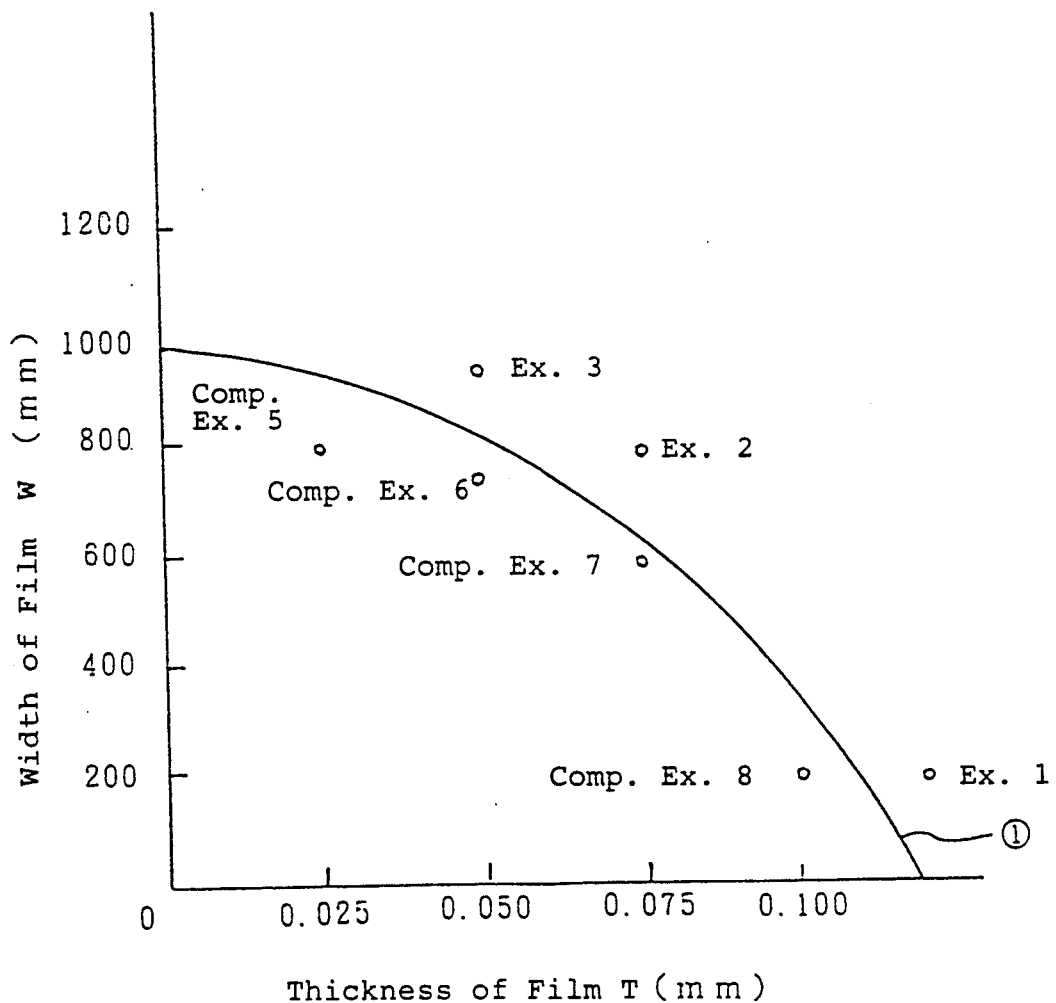
FIG. 3 is a graph showing the relationship between the thickness and the width of a film when the retardation value of the film is not more than 20 n.m.
Figure 4:
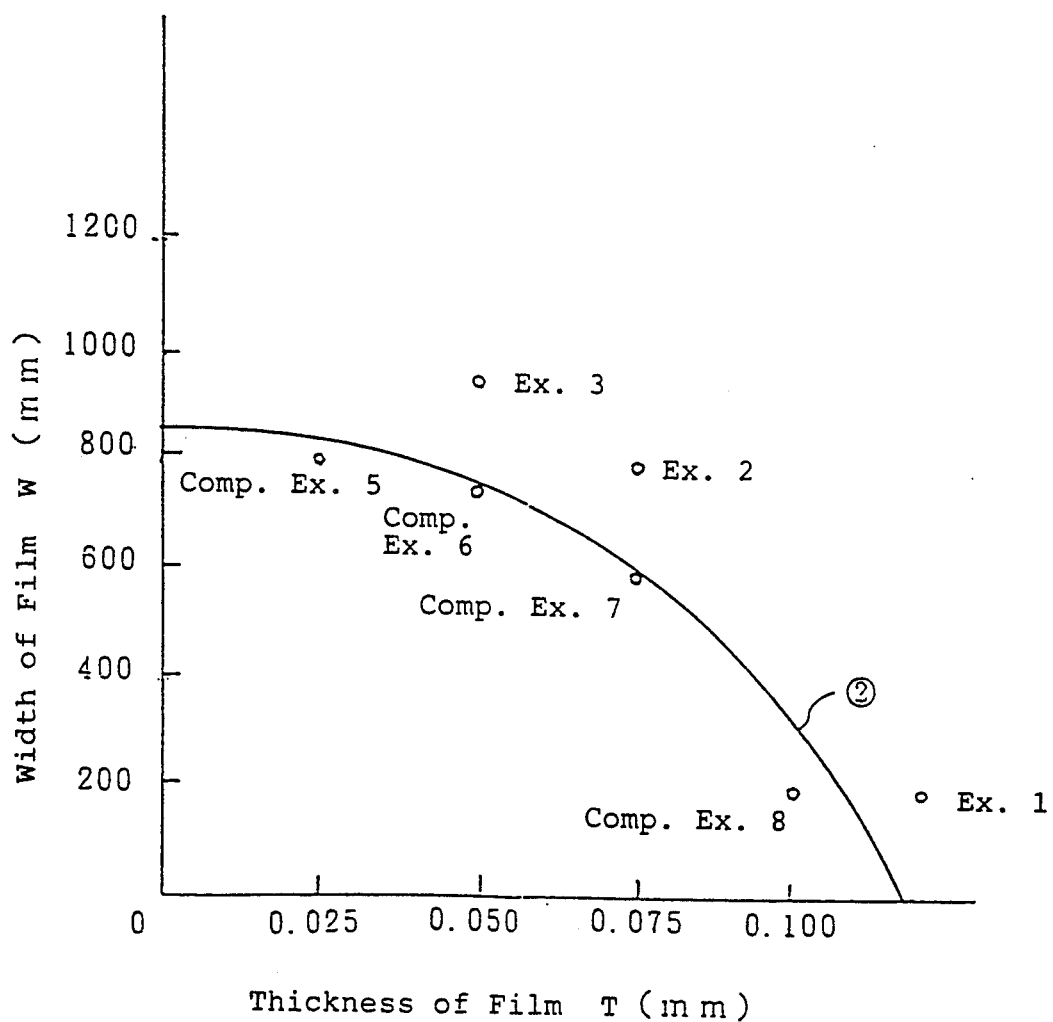
FIG. 4 is a graph showing the relationship between the thickness and the width of a film when the retardation value of the film is not more than 10 n.m.

Also, FIG. 3 is a graph showing the relationship between the film width (mm) (the ordinate) and the film thickness (mm) (the abscissa) when the retardation value is not more than 20 n.m. and FIG. 4 is a graph showing the relationship between the film width (mm) (the ordinate) and the film thickness (mm) (the abscissa) when the retardation value is not more than 10 n.m.

In both graphs, curve (1) is the parabola of $W = 1000 - 70,000 T^2$ and (2) is the parabola of

TABLE 2

| | Support | Thickness of polyarylate Film (μm) | Flow-stretched width of polyarylate Film (mm) | Drying Time on Support (min.) | | | | | Drying Condition Under Tension | | |
| | | | | 40 (°C.) | 100 (°C.) | 150 (°C.) | 180 (°C.) | 200 (°C.) | Tension (Kg/cm²) | Drying Temperature (°C.) | Drying Time (min.) |
|---|---|---|---|---|---|---|---|---|---|---|---|
| Example 4 | A | 120 | 200 | 9.0 | 6.0 | 6.0 | — | 6.0 | 9.5 | 200 | 20.0 |
| Example 5 | B | 75 | 800 | 3.0 | 2.0 | 2.0 | — | 2.0 | 10.0 | 200 | 10.0 |
| Example 6 | B | 50 | 1000 | 1.5 | 1.0 | 1.0 | — | 1.0 | 10.0 | 200 | 5.0 |
| Example 7 | B | 50 | 1000 | 1.5 | 1.0 | 1.0 | — | 1.0 | 10.0 | 180 | 15.0 |
| Comparative Example 2 | B | 50 | 1000 | 1.5 | 1.0 | 1.0 | — | 1.0 | 50.0 | 200 | 10.0 |
| Comparative Example 3 | B | 50 | 1000 | 1.5 | 1.0 | 1.0 | 2.0 | — | 10.0 | 200 | 10.0 |
| Comparative Example 4 | C | 50 | 1000 | 1.5 | 1.0 | 1.0 | — | 1.0 | — | — | — |

TABLE 3

| Measured Position* (mm) | Retardation Value (n.m.) | | | | | |
| | Example 4 | Example 5 | Example 6 | Example 7 | Comparative Example 2 | Comparative Example 3 |
|---|---|---|---|---|---|---|
| −500 | — | — | 5.8 | 2.5 | 10.0 | 27 |
| −400 | — | 4.4 | 7.0 | 3.2 | 15.9 | 45 |
| −300 | — | 6.4 | 7.8 | 3.6 | 19.8 | 57 |
| −200 | — | 7.8 | 8.5 | 4.0 | 22.5 | 62 |
| −100 | 4.1 | 8.8 | 8.8 | 4.4 | 24.2 | 72 |
| Center | 7.9 | 9.0 | 9.0 | 4.8 | 25.0 | 75 |
| 100 | 4.5 | 8.8 | 8.8 | 4.3 | 23.5 | 70 |
| 200 | — | 7.6 | 8.3 | 4.0 | 21.1 | 68 |
| 300 | — | 6.5 | 7.7 | 3.5 | 17.9 | 48 |
| 400 | — | 4.8 | 6.7 | 3.0 | 16.3 | 42 |
| 500 | — | — | 5.0 | 2.0 | 9.0 | 25 |

*The numeral shows the distance from the center of the film in the width direction thereof.

COMPARISON EXAMPLES 5 TO 8

The solution of polyarylate obtained in step (1) of the foregoing examples was flow-stretched at a width of 1200 mm on a polyethylene terephthalate (PET) film of 125 μm in thickness ("LUMILAR", trade name, made by Toray Industries, Inc., Tg:67° C.), and after drying the flow-stretched layer of the solution by transferring the film support having the flow-stretched solution thereon to a drying furnace kept at 40° C., the film formed was peeled off of the PET film to provide a polyarylate film having a self-supporting property.

While gripping both edges in the width direction of the film by clips, the film was dried stepwise for the time periods and at the temperatures shown in Table 4 below to provide polyarylate films each having an amount of residual solvent of less than 100 ppm (the measurable limit of the apparatus used), the thicknesses shown in Table 4, and optical isotropy.

The retardation value of each polyarylate film in the width direction of the film is shown in Table 5 below.

$W = 850 - 70,000 T^2$. For comparison, the results for the polyarylate films obtained in Examples 1 to 3 are also plotted in the graphs.

TABLE 4

| | Thickness of Polyarylate Film (μm) | Drying Time on PET Film (min.) | Amount of Residual Solvent After Drying on PET Film (%) | Drying Time in the State of Gripping both Edges of Film | |
| | | | | 200° C. | 250° C. |
|---|---|---|---|---|---|
| Comparative Example 5 | 25 | 1.5 | 14 | 0.8 | 2.7 |
| Comparative Example 6 | 50 | 1.5 | 20 | 1.0 | 3.2 |
| Comparative Example 7 | 75 | 3.0 | 22 | 1.25 | 1.25 |
| Comparative Example 8 | 100 | 6.0 | 23 | 1.67 | 1.67 |

TABLE 5

| Measured Position* | Retardation Value (n.m.) | | | |
| | Comparative Example 5 | Comparative Example 6 | Comparative Example 7 | Comparative Example 8 |
|---|---|---|---|---|
| −500 mm | 30 | 55 | 106 | >150 |
| −400 mm | 10 | 32 | 46 | 125 |
| −300 mm | 0 | 13 | 18 | 77 |
| −200 mm | 0 | 3 | 5 | 43 |
| −100 mm | 0 | 0 | 0 | 23 |
| Center | 0 | 0 | 0 | 11 |
| 100 mm | 0 | 0 | 0 | 15 |
| 200 mm | 0 | 0 | 7 | 34 |
| 300 mm | 0 | 2 | 22 | 67 |
| 400 mm | 6 | 20 | 50 | 120 |

TABLE 5-continued

| Measured Position* | Retardation Value (n.m.) | | | |
| --- | --- | --- | --- | --- |
| | Comparative Example 5 | Comparative Example 6 | Comparative Example 7 | Comparative Example 8 |
| 500 mm | 23 | 30 | 61 | >150 |

*The numeral shows the distance from the center of the film in the width direction thereof.

As described above, in the polyarylate film of this invention, the retardation value is very small and the distribution thereof is relatively uniform.

Also, according to the process for producing the polyarylate film of the present invention, a polyarylate film having excellent optical isotropy can be obtained in a good yield.

While the invention has been described in detail and with reference to specific embodiments thereof, it will be apparent to one skilled in the art that various changes and modifications can be made therein without departing from the spirit and scope thereof.

What is claimed is:

1. A polyarylate film having optical isotropy, wherein the film has a residual solvent content of not more than 1% by weight, the film satisfies the following relationship (2) between the film thickness T(mm) and the film width W(mm) and the retardation value of the film is not more than 10 n.m. over the whole range of the film:

$$W \geq 850 - 70{,}000 T^2 \qquad (2).$$

2. A process for producing a polyarylate film having optical isotropy comprising flow stretching a solution obtained by dissolving a polyarylate in a solvent on a synthetic resin film, drying the flow-stretched solution at a drying higher than the glass transition temperature of the polyarylate until the amount of residual solvent becomes not more than 1% by weight to form a film, and peeling the film off of the synthetic resin film, wherein the synthetic resin film has a glass transition temperature higher than the temperature of the polyarylate forming the film during drying or has no glass transition temperature.

3. A process for producing a polyarylate film having optical isotropy comprising flow stretching a solution obtained by dissolving a polyarylate in a solvent on a synthetic resin film, drying the flow-stretched solution at a first drying temperature of from 50° C. lower than the glass transition temperature Tg of the polyarylate to Tg to form a gel film having residual solvent content of not more than 5% by weight, peeling the gel film off of the foregoing synthetic resin fill, and drying the gel film while stretching the film at a tension of not higher than 10 kg/cm² at a temperature of from 50° C. lower than Tg to Tg and not higher than the first drying temperature until the amount of residual solvent is not more than 1% by weight to provide the thermoplastic resin film, wherein the synthetic resin film has a glass transition temperature higher than the temperature of the material forming the film during drying in the first drying step or has no glass transition temperature.

* * * * *